United States Patent
Noguchi et al.

(10) Patent No.: US 6,204,865 B1
(45) Date of Patent: Mar. 20, 2001

(54) COLOR IMAGE FORMING APPARATUS TIMING CONTROL

(75) Inventors: Junichi Noguchi, Yokohama; Tsunao Honbo, Kawasaki, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/115,242

(22) Filed: Jul. 14, 1998

(30) Foreign Application Priority Data

Jul. 15, 1997 (JP) .................................................. 9-189445
Jul. 15, 1997 (JP) .................................................. 9-189446

(51) Int. Cl.[7] .......................... G03L 15/00; G03G 15/01; G03G 15/04
(52) U.S. Cl. ............................................ 347/116; 347/248
(58) Field of Search .................................. 347/115, 116, 347/119, 129, 139, 248, 249, 250

(56) References Cited

U.S. PATENT DOCUMENTS

| | | | | |
|---|---|---|---|---|
| 4,704,698 | * | 11/1987 | Reiniger ................................. | 358/1.7 |
| 5,083,140 | * | 1/1992 | Peterson et al. ...................... | 347/248 |
| 5,233,402 | * | 8/1993 | Yagi et al. .............................. | 399/51 |
| 5,291,222 | * | 3/1994 | Ohashi ................................... | 347/248 |
| 5,570,195 | | 10/1996 | Hondo .................................... | 358/302 |

* cited by examiner

Primary Examiner—Joan Pendegrass
(74) Attorney, Agent, or Firm—Fitzpatrick, Cella, Harper & Scinto (57) ABSTRACT

The objective of this invention is to provide an apparatus which can form a high-quality image by reliably adjusting the superposing positions of frame images when a single image is formed by superposing a plurality of frame images, and especially, the objective of this invention is to reliably adjust the superposing positions of frame images and form a high-quality image by controlling a rotary polygon and image carrier to operate in association with each other.

To achieve such objectives, the apparatus of this invention generates a first signal indicating that the light beam coming from the rotary polygon has scanned a predetermined position, also generates a second signal independently of that detection, and moves the image carrier by selectively using the first and second signals as needed.

In this apparatus, by rotating a driving means N times on the basis of a reference signal obtained by frequency-dividing the first signal, the image carrier completes one rotation. During this interval, M first signals are generated. When X signals indicating the rotation timings upon one rotation of the driving means are generated, the frequency division ratio is given by $n = N \times X / M$.

7 Claims, 6 Drawing Sheets

COLOR IMAGE FORMING APPARATUS TIMING CONTROL

BACKGROUND OF THE INVENTION

1. Field of the Invention

The present invention relates to an image forming apparatus for forming a color image for one frame by superposing a plurality of frame images.

2. Related Background Art

Conventionally, a color image forming apparatus for printing out color image data, e.g., a laser beam printer (LBP), forms a latent image in units of lines on a photosensitive body by a main scanning means (e.g., by irradiating a laser beam onto the photosensitive body by a rotary polygon), forms images in units of color components using developing agents of individual color components such as magenta (M), cyan (C), yellow (Y), black (BK), and the like, and transfers and superposes the images in units of color components onto a paper sheet fixed on a transfer drum, thus forming a color image.

Another image forming apparatus temporarily superposes images in units of color components formed on the photosensitive body onto an intermediate transfer body, and simultaneously transfers a color image on the intermediate transfer body onto a paper sheet.

In such conventional image forming apparatuses, the photosensitive body and transfer drum or intermediate transfer body are driven at given velocities in a direction (sub-scanning direction) perpendicular to the main scanning direction, and every time the transfer drum or intermediate transfer body completes one rotation, each color image is superposed on the paper sheet on the transfer drum or the intermediate transfer body. Also, in still another image forming apparatus, images in units of recording color components are formed on the photosensitive body to overlap each other, and the formed color image is simultaneously transferred onto a recording paper sheet.

In the conventional color image forming apparatus, the image quality of a color image often deteriorates due to offsets of the superposing positions of individual color images. In order to prevent the superposing positions of the individual color images from offsetting, a method of controlling the position upon superposing each color image is important.

For this purpose, for example, the following technique has been proposed. That is, a main scanning start signal (BD signal) is frequency-divided to obtain an integer number of BD signals during one rotation of the photosensitive body or intermediate transfer body, and these BD signals are used as reference clocks for a motor for driving the photosensitive body or intermediate transfer body. In this way, the laser scanning line is always scanned at an identical position independently of the number of rotations of the photosensitive body or intermediate transfer body, thus allowing easy color registration.

However, a BD signal is generated by scanning a laser beam onto the photosensitive body by a rotary polygon, and detecting it by a BD sensor located in the vicinity of the main scanning start position of one line of the photosensitive body or the corresponding position in the optical path. Hence, with the above-mentioned technique, since the photosensitive body or intermediate transfer body cannot be driven before the BD signal is detected, a time loss is produced from when a laser is turned on to detect a BD signal after the beginning of image formation until the BD signal is detected, thus prolonging the image formation time.

The laser beam, for BD signal detection, repetitively scans an identical position on the photosensitive body before the photosensitive body begins to rotate, Thus, photosensitive body unwantedly develops a so-called drum memory, and cannot be uniformly charged even via the charge removal and charging processes of the photosensitive body later, resulting in a short service life of the photosensitive body.

Furthermore, the laser must always be ON to detect the BD signal so as to drive the photosensitive body or intermediate transfer body, thus shortening the service life of the laser.

SUMMARY OF THE INVENTION

The present invention has been made to solve the conventional problems, and has as its principal object to provide an apparatus which can form a high-quality image by reliably adjusting the superposing positions of frame images to each other when a single image is formed by superposing a plurality of frame images. In order to achieve this object, according to the present invention, a rotary polygonal mirror and image carrier are controlled to operate in association with each other to reliably adjust the superposing positions of frame images, thus forming a high-quality image.

Especially, it is an object of the present invention to provide a specific technique for controlling the rotary polygonal mirror and image carrier in association with each other.

In order to achieve the above objects, according to one preferred embodiment of the present invention, there is provided an image forming apparatus comprising:

a rotary polygon for forming a latent image on an image carrier by scanning the image carrier, which moves in a sub-scanning direction, in a main scanning direction using a light beam modulated based on image data;

first generation means for generating a first timing signal by detecting the light beam that has scanned a predetermined position;

second generation means for generating a second timing signal independently of the detection; and driving means for moving the image carrier in the sub-scanning direction by selectively using the first and second timing signals.

According to another preferred embodiment of the present invention, there is provided an image forming apparatus comprising:

a rotary polygon for forming a latent image on an image carrier by scanning the image carrier, which moves in a sub-scanning direction, in a main scanning direction using a light beam modulated based on image data;

first generation means for generating a detection signal which indicates that the light beam that has scanned a predetermined position; and driving means for rotating the image carrier once in the sub-scanning direction by rotating N times (N: a natural number) on the basis of a reference signal obtained by frequency-dividing the detection signal, the image carrier completing one rotation while M detection signals (M: a natural number) are generated, wherein the driving means generates X signals (X: a natural number) indicating the rotation timing while the driving means completes one rotation, and a frequency division ratio is given by $n = N \times X / M$.

Other objects and features of the present invention will become apparent from the following detailed description of

DETAILED DESCRIPTION OF THE PREFERRED EMBODIMENT

Figure 1:
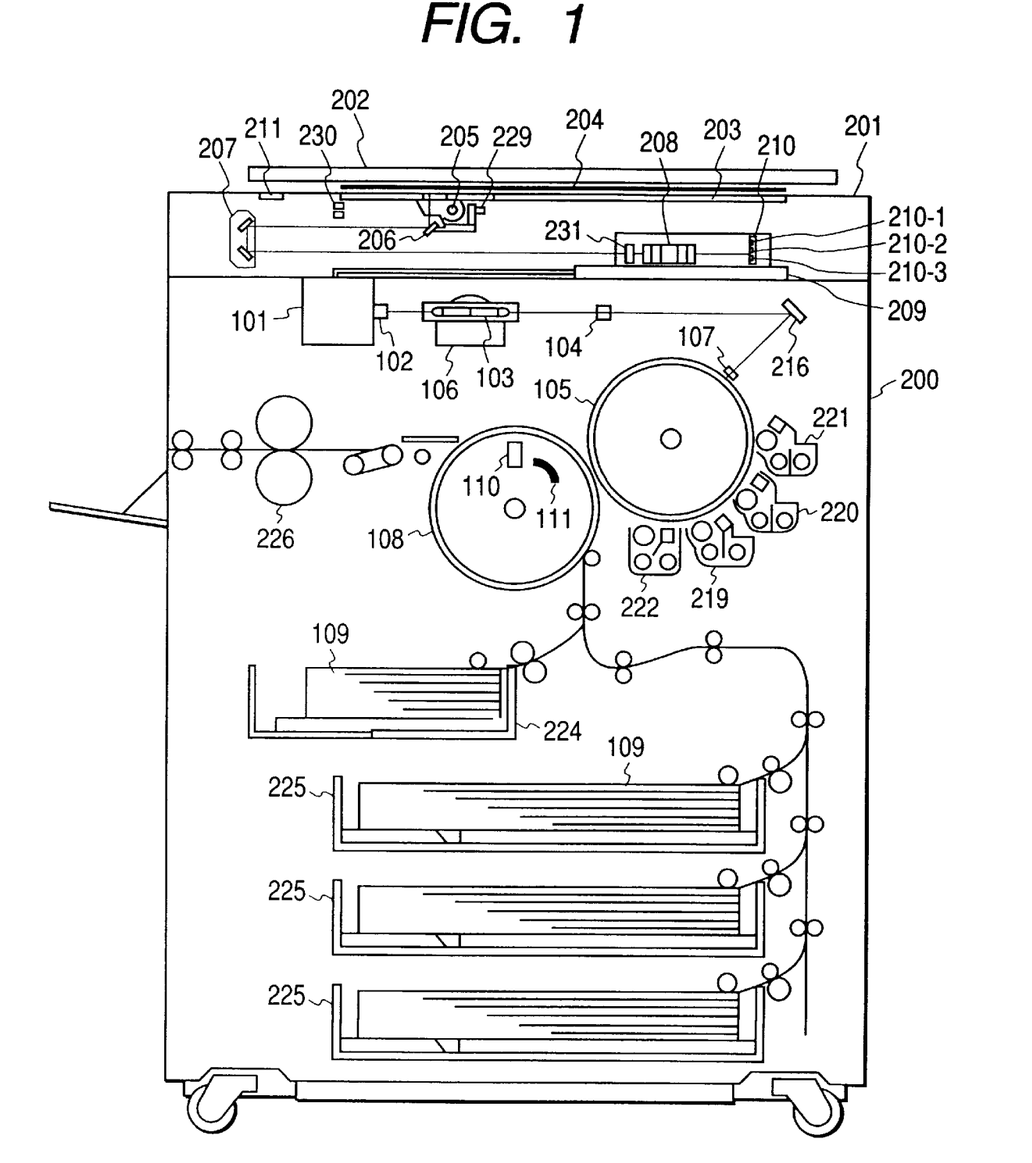
FIG. 1 is a sectional view showing the arrangement of an image forming apparatus applied to each embodiment.

FIG. 1 is a sectional view for explaining the arrangement of an image forming apparatus according to an embodiment of the present invention.

Referring to FIG. 1, an image scanner unit 201 reads an original image, and performs digital signal processing. A printer unit 200 prints out a full-color image based on the original image read by the image scanner unit 201 or image data transferred from an external apparatus such as a computer (not shown) onto a recording paper sheet.

In the image scanner unit 201, an original pressing plate 202 presses an original 204 on an original table glass 203 against the original table glass 203. A halogen lamp 205 irradiates light onto the original 204 on the original table glass 203.

A 3-line sensor (to be referred to as a CCD hereinafter) 210 is comprised of a red (R) sensor 210-1, green (G) sensor 210-2, and blue (B) sensor 210-3, and reads the red (R), green (G), and blue (B) components of full-color information by color-separating optical information obtained by imaging light reflected by the original 204 onto the CCD via mirrors 206 and 207, and a lens 208 with an infrared cut filter 231. A signal processor 209 electrically processes R, G, and B signals read by the R, G, and B sensors 210-1 to 210-3 to convert them into magenta (M), cyan (C), yellow (Y), and black (BK) components, and sends these components to the printer unit 200.

A standard white plate 211 is used for generating correction data by reading light reflected by the standard white plate 211 by the R, G, and B sensors 210-1 to 210-3. This standard white plate 211 exhibits nearly uniform reflection characteristics from visible light to infrared light, and is white in the visible range. Using this standard white plate, output data from the R, G, and B sensors 210-1 to 210-3 in the visible range are corrected. An optical sensor 230 generates an image leading end signal VTOP together with a flag plate 229.

In the printer unit 200, an image writing timing control circuit 101 modulates and drives a semiconductor laser 102 on the basis of magenta (M), cyan (C), yellow (Y), and black (BK) image signals input from the image scanner unit 201 or an external apparatus such as a computer (not shown). A polygonal mirror 103 is rotated by a polygon motor 106, and reflects a laser beam emitted by the semiconductor laser 102 to scan it on a photosensitive drum 105 via an f-θ lens 104 and return mirror 216.

The photosensitive drum 105 holds an electrostatic latent image formed thereon by a laser beam scanned by the polygonal mirror 106. A BD sensor 107 is placed in the vicinity of the scanning start position of one line of the laser beam, detects line scanning of the laser beam, and generates a scanning start reference signal (BD signal) for each line during a single period.

Magenta (M), cyan (C), yellow (Y), and black (BK) developers 219, 220, 221, and 222, respectively, develop electrostatic latent images on the photosensitive drum 105 to form toner images. A transfer drum 108 chucks and conveys a recording paper sheet 109 fed from a paper cassette 224 or 225, and transfers the toner images formed on the photosensitive drum 105 onto the recording paper sheet 109.

A sensor 110 is equipped inside the transfer drum 108, and detects passage of a flag 111 fixed inside the transfer drum 108 upon rotation of the transfer drum 108, thus generating an ITOP signal (indicating the leading end position of a recording paper sheet chucked on the transfer drum 108) in units of colors. A fixing unit 226 fixes the toner images transferred onto the recording paper sheet by the transfer drum 108.

The operations of the respective units will be explained below.

The original 204 on the original table glass 203 is irradiated with light emitted by the halogen lamp 205, and light reflected by the original 204 forms an image on the CCD 210 by the lens 208 via the mirrors 206 and 207. The CCD 210 then color-separates optical information from the original 204 to read the red (R), green (G), and blue (B) components of full-color information, and sends them to the signal processor 209. Note that the halogen lamp 205 and mirror 206 mechanically move at a velocity "v", and the mirror 207 at a velocity "v/2" in a direction (to be referred to as a sub-scanning direction hereinafter) perpendicular to the electrical scanning direction (to be referred to as a main scanning direction hereinafter) of the line sensors, thus scanning the entire original surface.

Also, output data from the R, G, and B sensors 210-1 to 210-3 in the visible range are corrected using the standard white plate 211. Furthermore, the optical sensor 230 generates an image leading end signal VTOP together with the flag plate 229. The signal processor 209 electrically processes the read R, G, and B signals to convert them into magenta (M), cyan (C), yellow (Y), and black (BK) components, and supplies these components to the printer unit 200.

Note that one of M, C, Y, and Bk components is sent to the printer unit 200 per original scan of the image scanner unit 201, and a single printout is completed by a total of four original scans.

On the other hand, image signals sent from the image scanner unit 201 or an external apparatus such as a computer (not shown) are sent to the image writing timing control circuit 101. The image writing timing control circuit 101 modulates and drives the semiconductor laser 102 in accordance with the magenta (M), cyan (C), yellow (Y), and black (BK) image signals. A laser beam emitted by the semiconductor laser 102 is reflected by the rotating polygonal mirror 103, f-θ-corrected by the f-θ lens 104, reflected by the return mirror 216, and scans the surface of the photosensitive drum 105, thus forming an electrostatic latent image on the photosensitive drum 105.

Furthermore, the four developers 219 to 222 alternately contact the photosensitive drum 105 during four rotations of the photosensitive drum 105, and develop M, C, Y, and BK electrostatic latent images formed on the photosensitive drum 105 with corresponding toners. The recording paper sheet 109 fed from the paper cassette 224 or 225 is wound around the transfer drum 108, and the four-color, i.e., M, C, Y, and BK toner images developed by the developers are transferred in turn onto the paper sheet 109. After that, the recording paper sheet 109 is discharged via the fixing unit 226.

Figure 2:
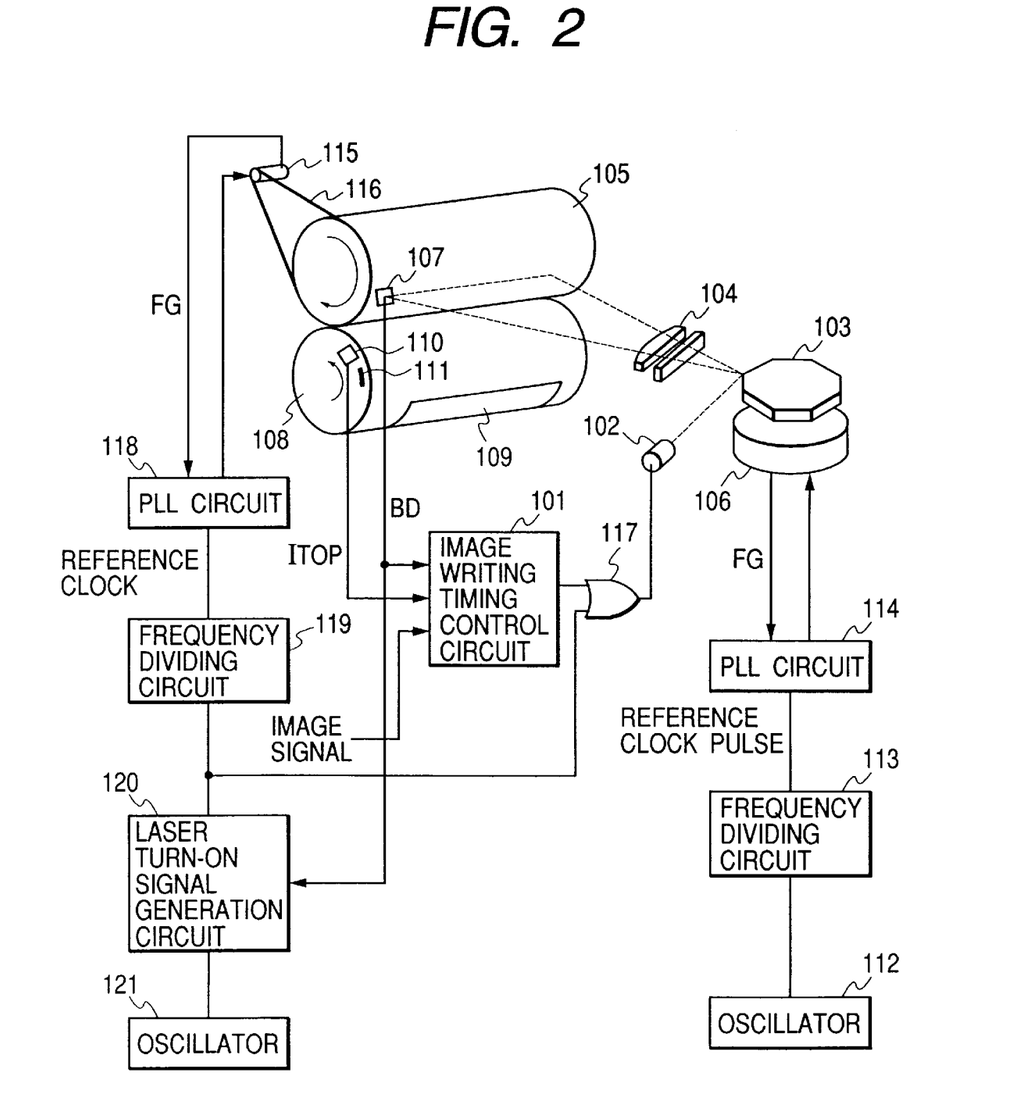
FIG. 2 is a diagram showing the first arrangement of a printer unit of the image forming apparatus shown in FIG. 1.

FIG. 2 is a diagram for explaining the arrangement of the printer unit 200 of the image forming apparatus shown in FIG. 2, and the same reference numerals in FIG. 2 denote the same parts as in FIG. 1.

Referring to FIG. 2, an oscillator 112 outputs clocks of a predetermined frequency. A frequency dividing circuit 113 frequency-divides clocks output from the oscillator 112 at a predetermined frequency division ratio to generate polygon motor driving pulses (reference clock pulses CLK-P). A PLL circuit 114 PLL-controls the driving voltage applied to the polygon motor 106 by detecting the phase difference and frequency deviation between motor FG pulses output upon rotation of the polygon motor 106, and the reference clock pulses CLK-P and comparing them, so that the FG pulses and reference clock pulses CLK-P are in phase with each other.

An oscillator 121 outputs clocks of a predetermined frequency. A laser turn-on signal generation circuit 120 receives clocks from the oscillator 121 and a BD signal from the BD sensor 107, and outputs a laser turn-on signal for BD signal detection. An OR gate 117 outputs an image signal from the image writing timing control circuit 101 or a laser turn-on signal for BD signal detection from the laser turn-on signal generation circuit 120 to the semiconductor laser 102 to modulate and drive the semiconductor laser 102.

A frequency dividing circuit 119 frequency-divides a laser turn-on signal for BD signal detection from the laser turn-on signal generation circuit 120 at a predetermined frequency division ratio to generate photosensitive motor driving pulses (reference clocks CLK). A PLL circuit 118 PLL-controls the driving voltage applied to a photosensitive drum motor 115 by detecting the phase difference and frequency deviation between motor FG pulses output upon rotation of the photosensitive drum motor 115, and the reference clocks CLK and comparing them, so that the FG pulses and reference clocks CLK are in phase with each other.

The operations of the respective units will be explained below.

Image signals transferred from the image scanner unit 201 shown in FIG. 1 or an external apparatus such as a computer (not shown) are sent to the image writing timing control circuit 101, which modulates and drives the semiconductor laser 102 in accordance with magenta (M), cyan (C), yellow (Y), and black (BK) image signals via the OR gate 117. A laser beam emitted by the semiconductor laser 102 is reflected by the rotating polygonal mirror 103, f-θ-corrected by the f-θ lens 104, reflected by the return mirror 216 (FIG. 1), and scans the surface of the photosensitive drum 105, thus forming an electrostatic latent image on the photosensitive drum 105.

The polygon motor 106 is rotated when polygon motor driving pulses (reference clock pulses CLK-P), which are generated by frequency-dividing clocks from the oscillator 112 by the frequency dividing circuit 113, are supplied to the PLL circuit 114. The PLL circuit 114 PLL-controls the driving voltage applied to the polygon motor 106 by detecting the phase difference and frequency deviation between motor FG pulses output upon rotation of the polygon motor 106, and the reference clock pulses CLK-P and comparing them, so that the FG pulses and reference clock pulses CLK-P are in phase with each other.

Figure 3:
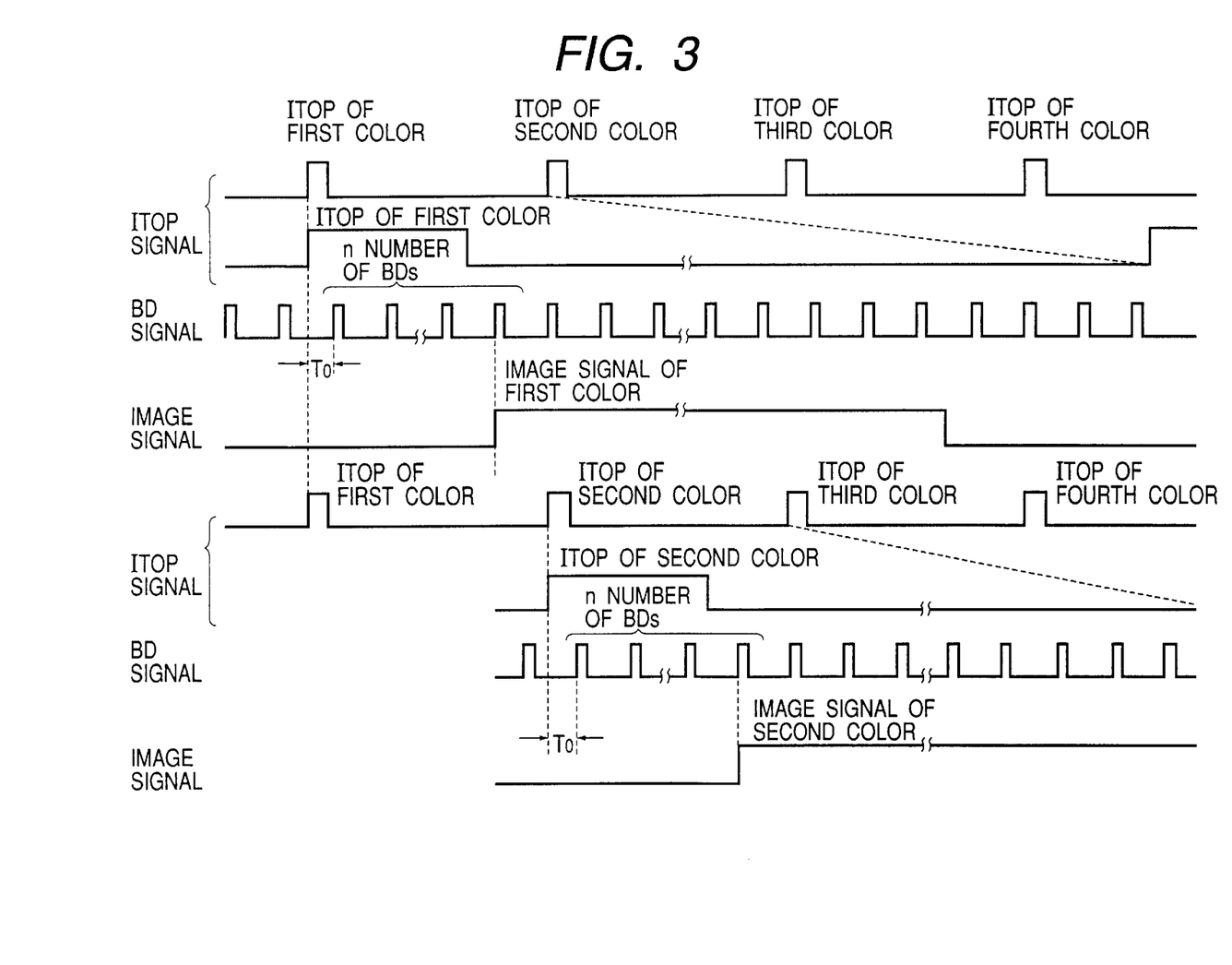
FIG. 3 is a timing chart showing the image formation timing of the printer unit.

The BD sensor 107 located in the vicinity of the scanning start position of one line of a laser beam detects a line scan of the laser beam, and generates a scanning start reference signal (BD signal) for each line in a single period, as shown in FIG. 3 (to be described later).

The sensor 110 in the transfer drum 108 detects the flag 111 fixed in the transfer drum 108 upon rotation of the transfer drum 108, and generates an ITOP signal (indicating the leading end position of the recording paper sheet 109 on the transfer drum 108) for each color, as shown in FIG. 3 (to be described later).

Furthermore, the photosensitive drum motor 115 rotates when motor driving pulses (reference clocks CLK), which are generated by frequency-dividing a laser turn-on signal for BD signal detection from the laser turn-on signal generation circuit 120 by the frequency dividing circuit 119, are supplied to the PLL circuit 118.

The PLL circuit 118 PLL-controls the driving voltage applied to the photosensitive drum motor 115 by detecting the phase difference and frequency deviation between motor FG pulses output upon rotation of the photosensitive drum motor 115, and the reference clocks CLK and comparing them, so that the FG pulses and reference clocks CLK are in phase with each other. The photosensitive drum 105 is driven to rotate by the photosensitive drum motor 115 in the direction of an arrow in FIG. 2 via a gear belt 116. At this time, the transfer drum 108 is rotated in the direction of an arrow (sub-scanning direction) in synchronism with the photosensitive drum 105 at a speed equal to that of the drum 105 since it is coupled to the drum 105 via a gear (not shown). These BD signals and ITOP signals are input to the image writing timing control circuit 101, which outputs an image signal to the semiconductor laser 102 at, e.g., the following timing. More specifically, in synchronism with the leading edge of an n-th BD signal after detection of the leading edge of the ITOP signal, an image signal is irradiated as a modulated laser beam onto the photosensitive drum 105, as shown in FIG. 3 (to be described below).

FIG. 3 is a timing chart showing the image formation timing of the printer unit 200 of the image forming apparatus shown in FIG. 1.

Referring to FIG. 3, an ITOP signal is output when the sensor 110 in the transfer drum 108 detects the flag 111 fixed in the transfer drum 108 upon rotation of the transfer drum 108, and indicates the leading end position of the recording paper sheet 109 on the transfer drum 108. The ITOP signal is output in units of colors.

A BD signal is output when the BD sensor 107 located in the vicinity of the scanning start position of one line of a laser beam detects a line scan of the laser beam, and serves as a scanning start reference signal for each line during a single period.

An image signal is output to the semiconductor laser 102 via the OR gate in synchronism with the leading edge of the n-th BD signal after the BD and ITOP signals are input to the image writing timing control circuit 101 and the leading edge of the ITOP signal is detected. More specifically, the image signal is irradiated as a modulated laser beam onto the photosensitive drum 105 in synchronism with the leading edge of the "n"-th BD signal after detection of the leading edge of the ITOP signal.

Figure 5:
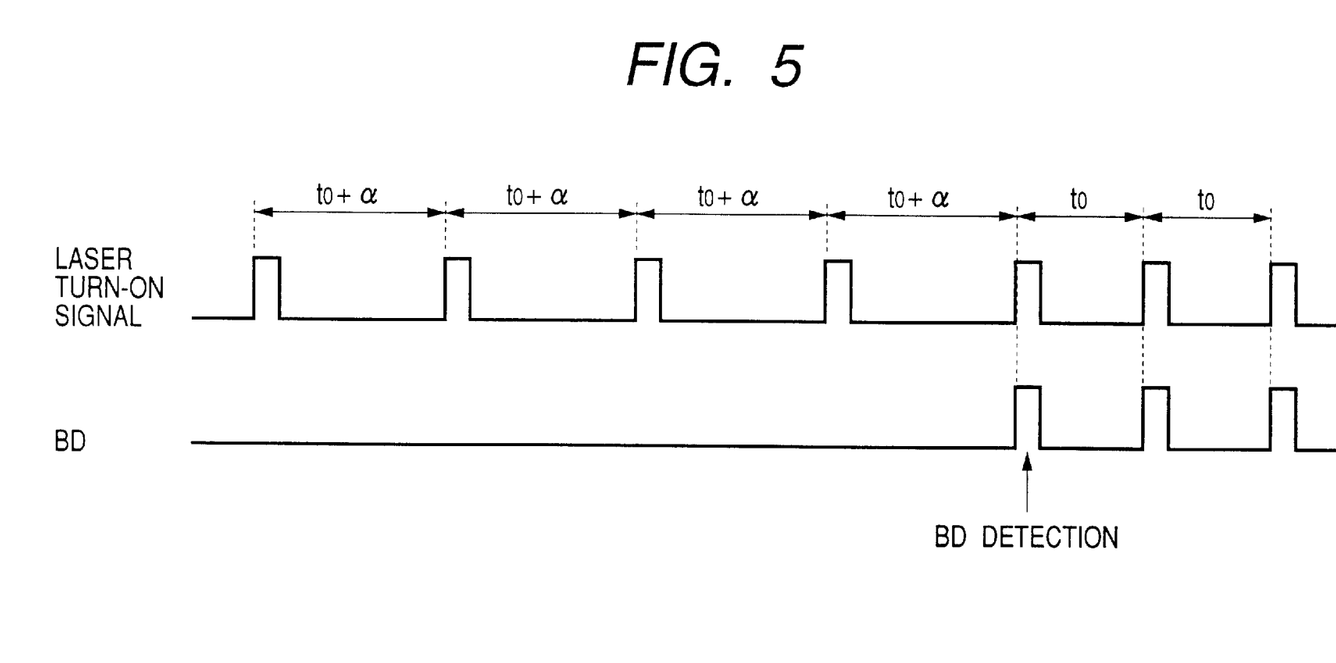
FIG. 5 is a timing chart showing the period change timing of a laser turn-on signal generated by the laser turn-on signal generation circuit shown in FIG. 4.

In order to detect a BD signal, the laser must be kept ON until the BD signal is detected. However, when the laser is kept ON, not only the problem of a short laser service life, but also the problem of drum memory arising from a laser beam that scans the image forming region on the photosensitive drum 105 are posed. Since the period of the BD signal is known beforehand based on the rotational speed of the polygon motor and the number of surfaces of the polygonal mirror, a laser turn-on signal is supplied from the laser turn-on signal generation circuit 120 to the semiconductor laser 102 via the OR gate 117 at a period "t0+α" longer by "α" than the period "t0" of the BD signal, as shown in FIG. 5 (to be described later).

When a laser beam scans the BD sensor 107 at the laser turn-on timing, i.e., when the BD signal is detected, the period of the laser turn-on signal is changed to "t0" equal to that of the BD signal. Since the photosensitive drum motor 115 is rotated by reference clocks obtained by frequency-dividing the laser turn-on signal, a laser beam can be prevented from always scanning an identical position, thus avoiding deterioration of the photosensitive drum 105. More specifically, even when the polygonal mirror 103 does not scan a laser beam at all, the drum motor 115 can be rotated by the laser turn-on signal alone.

Figure 4:
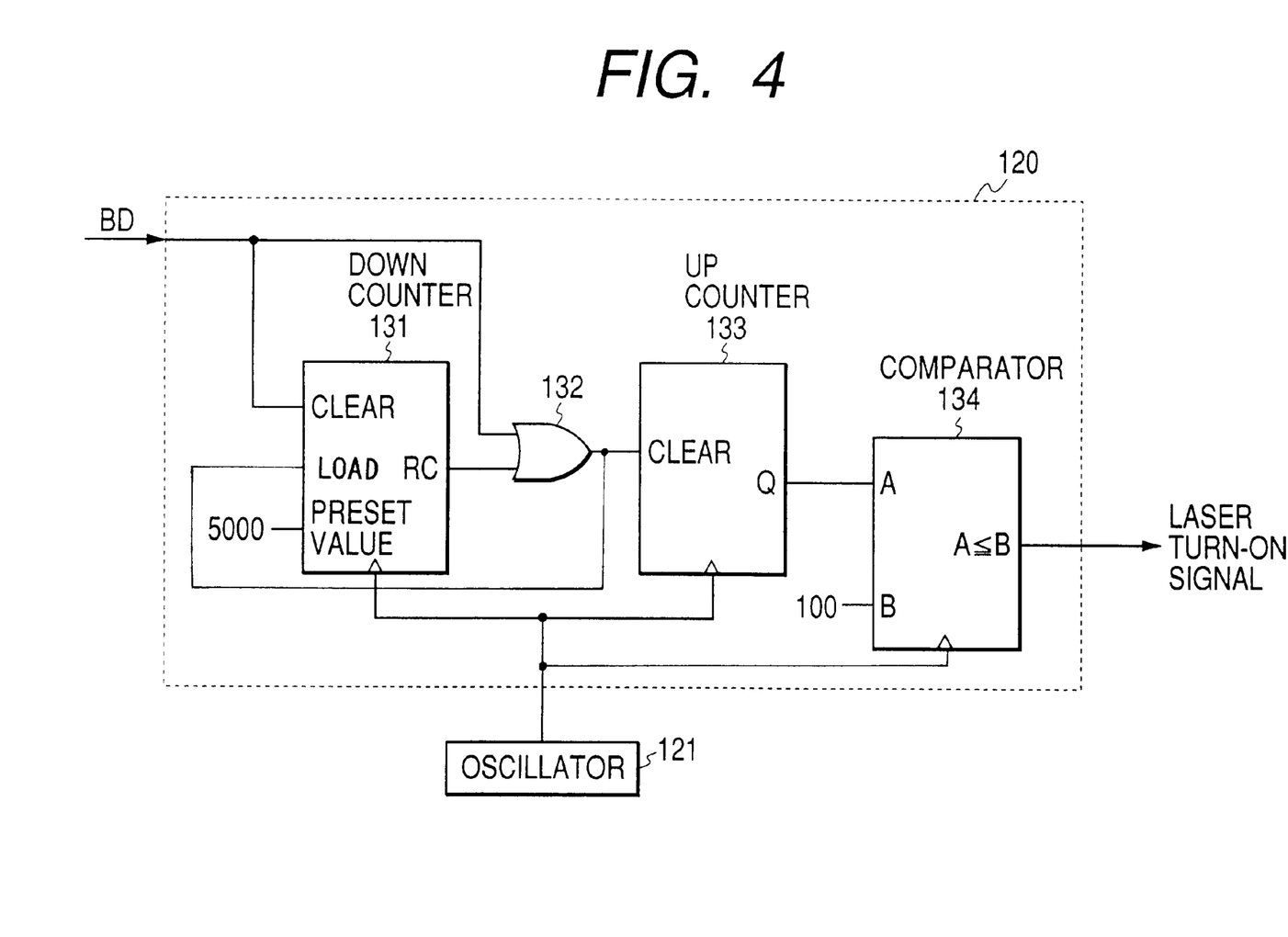
FIG. 4 is a block diagram of a laser turn-on signal generation circuit shown in FIG. 2.

FIG. 4 is a block diagram for explaining the arrangement of the laser turn-on signal generation circuit 120 shown in FIG. 2. Elements same as those shown in FIG. 2 are referred to by the same references as FIG. 2.

Referring to FIG. 4, a 13-bit down counter 131 counts clocks generated by the oscillator 121, and outputs a ripple carry (RC) after the period "t0+α" longer by "α" than the period "t0" of the BD signal. For this purpose, the down counter 131 receives, e.g., a pre-set value "5,000" corresponding to "t0+α" as the number of clocks of the oscillator 121. A 12-bit up counter 133 counts clocks generated by the oscillator 121. A comparator 134 generates a laser turn-on signal which is "H (laser turn-on)" before the count value of the up counter 133 reaches 100, and which is "L (laser turn-off)" after the count value has exceeded 101.

Note that the down counter 131 is cleared in response to a BD signal from the BD sensor 107, and the up counter 133 is cleared in response to an RC output from the down counter 131 via an OR gate 132 or the BD signal from the BD sensor 107. For this reason, once the BD signal is input, the down counter 131 is cleared by the BD signal before it outputs RC. After that, a laser turn-on signal is output at the period "t0" of the BD signal as shown in FIG. 5.

FIG. 5 is a timing chart showing the period change timing of the laser turn-on signal generated by the laser turn-on signal generation circuit 120 shown in FIG. 4.

Referring to FIG. 5, the laser turn-on signal is transmitted from the laser turn-on signal generation circuit 120 to the semiconductor laser 102 via the OR gate 117 at the period "t0+α" longer by "α" than the period "t0" of the BD signal.

When the laser beam scans the BD sensor 107 at the laser turn-on timing, i.e., when the BD signal is output, the laser turn-on signal generation circuit 120 changes the period of the laser turn-on signal to the period "t0" which is equal to that of the BD signal.

In this case, since the reference clocks for the photosensitive drum motor 115 are generated by frequency-dividing the laser turn-on signal generated by the laser turn-on signal generation circuit 120 by the frequency dividing circuit 119, the period has changed from "t0+α" to "t0" at the switching timing, and image writing cannot be done before the motor speed converges to that corresponding to the switched period "t0". Hence, such convergence time until speed stabilization must be taken into consideration.

However, since the changes in period of reference clocks before and after the switching are always constant and, hence, the convergence time is also always constant, the convergence time can be easily coped with.

Note that reference clocks of the photosensitive drum motor 115 are switched upon forming each color image, thus correcting any positional offset of each color image.

Figure 6:
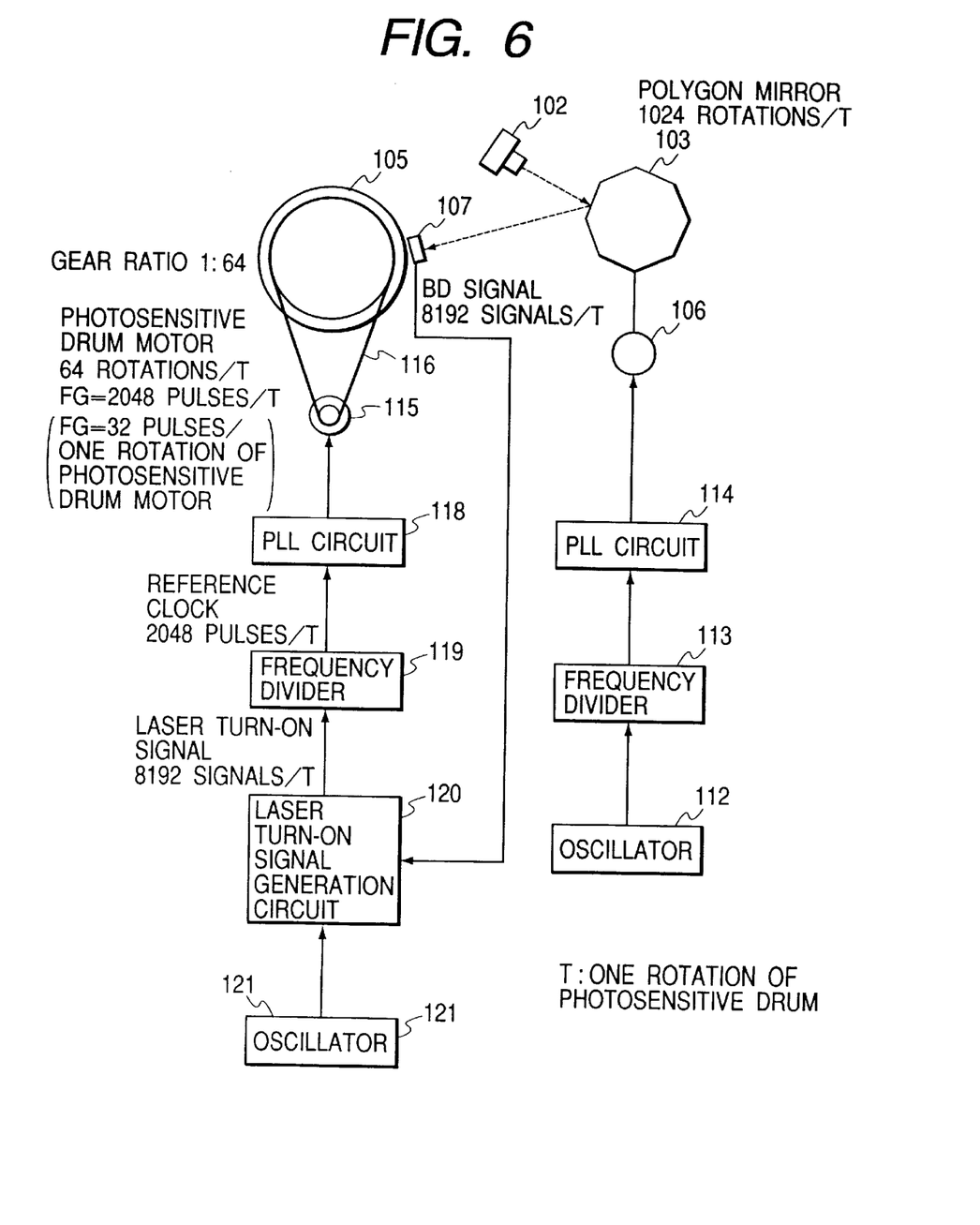
FIG. 6 is a diagram showing the second arrangement of a printer unit of the image forming apparatus shown in FIG. 1.

FIG. 6 is a diagram for explaining the arrangement of the printer unit 200 of the image forming apparatus shown in FIG. 2, and especially shows the relationship between the photosensitive drum motor 115 and BD signals during one rotation of the photosensitive drum 105. Note that the same reference numerals in FIG. 6 denote the same parts as in FIG. 2.

An integer number of BD signals are output for one rotation of the photosensitive drum 105, so that the scanning line of a laser beam on the photosensitive drum 105 is always at an identical position. For example, in this embodiment, the number of BD signals output per rotation of the photosensitive drum is "8,192" which is determined based on the process speed and resolution (i.e., the number of rotations of the polygonal mirror 103 is "1,024").

The gear ratio of the gear belt 116 is set at "1: 64" so that the photosensitive drum motor 115 completes "64" rotations per rotation of the photosensitive drum 105. Furthermore, since "32" FG pulses are output per rotation of the photosensitive drum motor 115, one rotation of the photosensitive drum motor 115 requires "32" reference clocks CLK of the photosensitive drum motor 115.

Hence, in order to complete one rotation of the photosensitive drum 105, the photosensitive drum motor 115 requires "64(rotations)×32(pulses)=2,048 (pulses)" reference clocks CLK. For this reason, when a laser turn-on signal which is equivalent to the BD signal and is output from the laser turn-on signal generation circuit 120 is frequency-divided by "2,048/8,192=¼", and the divided signals are used as reference clocks CLK of the photosensitive drum motor 115, the photosensitive drum 105 completes one rotation every time "8,192" BD signals are output.

More specifically, let "n" be the frequency division ratio, "N" be the number of rotations of the photosensitive drum motor 115 per rotation of the photosensitive drum 105, "X" be the number of FG pulses per rotation of the photosensitive drum motor 115, and "M" be the number of BD signals per rotation of the photosensitive drum 105. Then, the values of these variables are so selected that "n=N×X/M" holds.

Note that the gear ratio of this gear belt 116 is selected to assume a natural number. This is to make the influences of decentering of the motor shaft and reduction gear constant upon each rotation of the photosensitive drum 105 by rotating the motor and reduction gear several times per rotation of the photosensitive drum 105, thus reducing color misregistration arising from decentering to zero.

As a consequence, on the photosensitive drum 105, the scanning line of the first scan of the second rotation overlaps the scanning line of a laser beam written with reference to the BD signals for the first scan of the first rotation, and the scanning lines of the first scans of the first and second rotations overlap each other every "8,192" BD signals.

Hence, when the reference clocks are switched upon formation of each color image, the phase difference between the ITOP and BD signals becomes always constant ("T0"), as shown in FIG. 3. Hence, when image writing starts based on the ITOP signal, the writing start positions of images of the first to N-th colors can be accurately adjusted, thus obtaining a high-quality image free from any color misregistration.

Furthermore, since the reduction gear, gear belt 116, and the like for transmitting driving forces to the photosensitive drum motor 115 and photosensitive drum 105 always return to identical positions every time the photosensitive drum 105 completes one rotation, the influences of decentering of the motor shaft and reduction gear in units of rotations of the photosensitive drum 105 can be made constant, and color misregistration resulting from such decentering can be reduced to zero.

With the simple arrangement described above, the writing start positions of individual images on the paper sheet can be matched with that of the first color, and a high-quality image free from any color misregistration can be obtained.

Since the laser need not be kept ON to start rotation of the photosensitive drum, the laser turn-on time can be shortened, and the photosensitive drum can be rotated before the BD signal is detected. Also, since the laser is turned on to detect a BD signal while rotating the photosensitive drum, there is no fear of drum memory.

Furthermore, since the changes in period of the reference clocks for the drum motor before and after BD detection are always constant, and the convergence time required until the drum motor speed stabilizes is also always constant, the convergence time can be easily coped with.

The objects of the present invention are also achieved by supplying a storage medium, which records a program code of a software program that can realize the functions of the above-mentioned embodiment to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magnetooptical disk, CD-ROM, CD-R, magnetic tape, nonvolatile memory card, ROM, EEPROM, and the like may be used.

The functions of the above-mentioned embodiment may be realized not only by executing the read out program code by the computer but also by some or all of actual processing operations executed by an OS (operating system) running on the computer on the basis of an instruction of the program code.

Furthermore, the functions of the above-mentioned embodiment may be also realized by some or all of actual processing operations executed by a CPU or the like arranged in a function extension board or a function extension unit, which is inserted in or connected to the computer, after the program code read out from the storage medium is written in a memory of the extension board or unit.

The present invention can be applied to either a system constructed by a plurality of equipments or an apparatus consisting of a single equipment. The present invention can also be applied to a case wherein the invention is achieved by supplying a program to the system or apparatus. In this case, by loading a storage medium that stores a program represented by software for achieving the present invention onto the system or apparatus, the system or apparatus can obtain the effect of the present invention.

By downloading a program represented by software for achieving the present invention from a database on a network via a communication program, the system or apparatus can obtain the effect of the present invention.

To restate, according to this embodiment, since a rotation driving means rotates an image carrier by selectively using a first timing signal which is generated by a first generation means by detecting the scanning timing of a light beam deflected by a rotary polygon at a predetermined position, and a second timing signal which is generated by a second generation means without detecting the scanning timing of the deflected light beam at the predetermined position, the image carrier is rotated using the second timing signal before detection of the light beam at the predetermined position to prevent the light beam from repetitively scanning an identical position on the image carrier before detection of the light beam at the predetermined position, thus preventing deterioration of the image carrier.

Also, since the rotation driving means rotates the image carrier using the first timing signal after it uses the second timing signal every time one image is formed, rotation adjustment of the image carrier can be achieved every time one image is formed, and a high-precision image free from any positional offset between images can be formed.

Furthermore, since the second timing signal has a period longer than that of the first timing signal, the rotation period of the image carrier can be changed by only the difference between the periods of the first and second timing signals, and the convergence time until driving of the image carrier becomes stable can be made constant, thus allowing stable image formation.

Moreover, when the light beam is not deflected by the rotary polygon, and the image carrier is to be rotated, the rotation driving means drives the image carrier using the second timing signal. Hence, the image carrier can be rotated before image formation begins, and the time required before image formation begins can be shortened.

Hence, the service life of the image carrier can be prolonged greatly, and a high-precision image can be formed efficiently.

According to the aforementioned embodiment, the rotary polygon deflects a light beam on the basis of input image information to scan it on the surface of the image carrier rotated by the driving means, a first pulse generation means generates a first pulse signal by detecting the light beam scanned by the rotary polygon, a second pulse generation means generates a second pulse signal as driving pulses of the driving means by frequency-dividing the first pulse signal at a predetermined frequency division ratio so that the image carrier completes just one rotation while the first pulse generation means generates a predetermined integer number of first pulse signals, and a control means controls driving of the driving means on the basis of the second pulse signal generated by the second pulse generation means. Hence, the scanning start position of the rotary polygon can be accurately adjusted by a simple structure upon each rotation of the image carrier.

Also, since a transmission means transmits the driving force of the driving means to the image carrier so that the image carrier completes just one rotation while the driving means rotates a predetermined integer number of times, the driving means and transmission means always return to identical positions upon each rotation of the image carrier, thus making the influences of decentering of the driving means and transmission means constant upon each rotation of the image carrier.

Consequently, the image writing positions of individual color images can be accurately adjusted, and a color image free from any color misregistration among color images can be formed.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image forming apparatus comprising:

a rotary polygon for forming a latent image on an image carrier by scanning said image carrier, which moves in a sub-scanning direction, in a main scanning direction using a light beam modulated based on image data;

first generation means for generating a first timing signal by detecting the light beam that has scanned a predetermined position;

second generation means for generating a second timing signal independently of the detection of the light beam, a generation period of the second timing signal being different from a proper generation period of the first timing signal;

turn-on control means for turning on the light beam, for a predetermined period of main scanning according to the second timing signal, during a period preceding modulation of the light beam based on the image data; and driving control means for controlling driving of said image carrier in the sub-scanning direction by first using the second timing signal and thereafter using the first timing signal to move said image carrier.

2. An apparatus according to claim 1, wherein said rotary polygon sequentially forms latent images for a plurality of frames on said image carrier, and said apparatus further comprises a transfer body to which the formed latent images are transferred in turn.

3. An apparatus according to claim 2, wherein said rotary polygon sequentially forms the latent images for the plurality of frames on said image carrier, and said driving means uses the first timing signal after it uses the second timing signal every time the latent image for each frame is formed.

4. An apparatus according to claim 1, wherein a generation period of the second timing signal is longer than a generation period of the first timing signal.

5. An apparatus according to claim 1, further comprising a sensor for detecting the light beam at the predetermined position, wherein in a case in which said sensor detects the light beam while the driving of said image carrier is being controlled using the second timing signal, said driving control means switches from using the second timing signal to using the first timing signal to control the driving of said image carrier.

6. An image forming apparatus comprising:

a rotary polygon for forming a latent image on an image carrier by scanning said image carrier, which moves in a sub-scanning direction, in a main scanning direction using a light beam modulated based on image data;

generation means for generating a detection signal which indicates that the light beam that has scanned a predetermined position; and driving means for rotating said image carrier once in the sub-scanning direction by rotating N times (N: a natural number) on the basis of a reference signal obtained by frequency-dividing the detection signal, said image carrier completing one rotation while M detection signals (M: a natural number) are generated, wherein said driving means generates X signals (X: a natural number) indicating the rotation timing while said driving means completes one rotation, and a frequency division ratio of the detection signal is given by $n = N \times X / M$.

7. An image forming apparatus comprising:

a rotary polygon for forming a latent image on an image carrier by scanning said image carrier, which moves in a sub-scanning direction, in a main scanning direction using a light beam modulated based on image data;

a sensor for detecting the light beam at a predetermined position;

first generation means for generating a first timing signal by detecting by said sensor the light beam that has scanned said predetermined position;

second generation means for generating a second timing signal independently of the detection of the light beam, a generation period of the second timing signal being different from a proper generation period of the first timing signal;

turn-on control means for turning on the light beam for a predetermined period of main scanning according to the second timing signal during a period preceding modulation of the light beam based on the image data; and driving control means for controlling driving of said image carrier based on a signal which is different from the first timing signal, wherein said turn-on control means turns on the light beam at the generation period of the first timing signal in a case in which said sensor detects the light beam after the light beam is turned on according to the second timing signal, and wherein said driving control means controls the driving of said image carrier based on the first timing signal in the case in which said sensor detects the light beam after the light beam is turned on according to the second timing signal.

* * * * *